May 31, 1938. J. N. ALEXANDER 2,118,876
SAW CLAMP
Filed Aug. 18, 1934
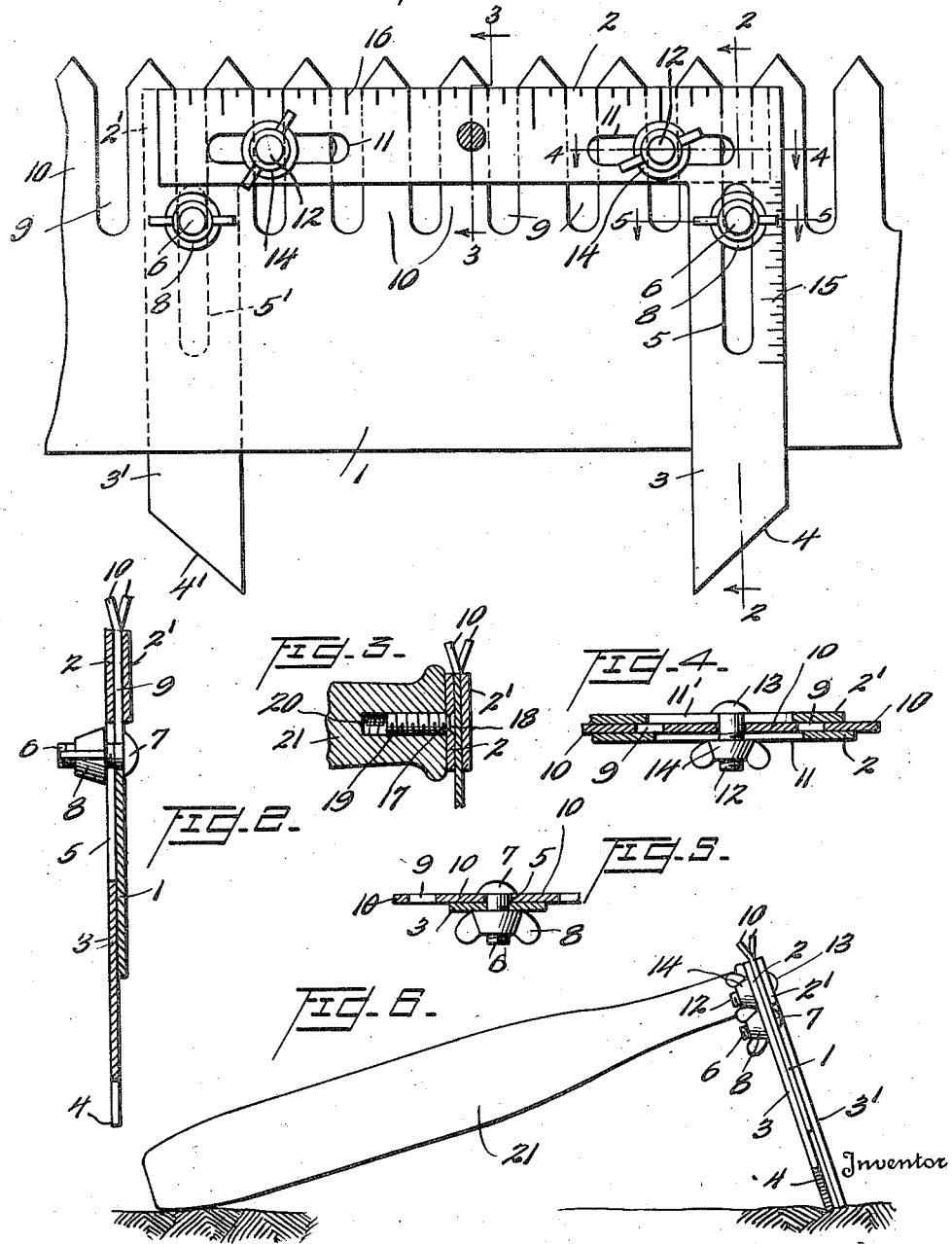
James N. Alexander
By Semmes & Semmes
Attorneys Patented May 31, 1938

2,118,876

UNITED STATES PATENT OFFICE 2,118,876

SAW CLAMP

James N. Alexander, Birmingham, Ala.

Application August 18, 1934, Serial No. 740,516

9 Claims. (Cl. 76—78)

My invention relates to support means for crosscut saws to enable them to be worked upon in the field to adjust or sharpen teeth or perform other repair or adjustment jobs.

In the field, when a crosscut saw becomes injured, it is difficult to set the teeth or sharpen them properly, and it is one of the purposes of this device to permit the teeth to be sharpened or set accurately while the worker is in the field.

It is an object of this invention to provide a light clamping device which will support the teeth of the crosscut saw well raised from the ground and firmly held in position for repair or adjustment.

It is a further object of the invention to provide a device which will accurately determine the amount of filing which is proper in sharpening the teeth of a crosscut saw.

It is a still further object of the invention to provide a device which is light, easy to construct and repair or replace, and which is sturdy and durable.

Yet a further object of the invention is to provide a measuring device which can be used in the field to measure wherever necessary, and which will materially aid in effecting saw adjustments and repairs.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions which, for the purpose of explanation, have been made the subject of illustration.

In the drawing:

Figure 1 is a plan view of my device applied to a portion of a crosscut saw.

Figure 2 is a view taken along the line 2—2 of Figure 1, looking in the direction of the arrows.

Figure 3 is a detail view taken along the line 3—3 of Figure 1, looking in the direction of the arrows.

Figure 4 is a view taken along the line 4—4 of Figure 1, looking in the direction of the arrows.

Figure 5 is a view taken along the line 5—5 of Figure 1, looking in the direction of the arrows.

Figure 6 is a view in side elevation of my device applied to a crosscut saw and in position on the ground.

Referring to the drawing, I have shown a crosscut saw blade 1. Adapted to lie on top of the crosscut saw blade is an angular frame comprising a member 2 which is adapted to lie in the direction of the length of the blade, and a depending member 3 which is formed at substantially right angles to the member 2 and which is adapted to project below the blade and to contact the ground, as shown in Figure 6.

The depending member 3 is sharpened, as indicated at 4, to firmly engage the supporting surface such as the ground.

In the depending member 3 I have provided a slot 5. In the slot is a bolt 6 having a head 7 and a wing nut 8. The bolt 6 is adapted to pass through the slot 5 in the depending member 3 and passes through one of the apertures 9 between the saw teeth 10.

In the portion 2 of the angular frame are located slots 11. A bolt 12 is adapted to pass through each slot. Each bolt 12 is provided with a head 13 and a wing nut 14 (see Figure 4).

It is obvious that the arrangement is such that the frame can be adjusted along the direction of length of the teeth so that the exact desired portion of the teeth may be exposed for sharpening or other operations. Also, because of the slots 11 the device may be firmly clamped to the saw in the direction of length of the saw, the slots 11 permitting the bolts 12 to be adjusted to take care of varying distances between teeth in different makes of saws.

On the depending portion 3 of the frame I have placed a measuring scale 15. Likewise, on the portion 2 I have a measuring scale 16. These scales are of use in effecting adjustments of the teeth so that the adjustment from section to section of the teeth may be uniform in a particular saw repair job. Also, the device can be used in the field for measuring trunks of trees and other uses where a square with measuring units formed thereon will be useful.

A piece substantially exactly similar to the angular frame comprising the members 2 and 3 is adapted to lie on the other side of the saw. I have indicated the various parts by numerals which are primed to indicate a like type of construction. For instance, the depending member is marked "3'", the horizontally extending portion "2'", and so forth.

It will be obvious that the corresponding angular frame member subserves a function similar to that just described. The slots 11 and 11' of the lengthwise-extending portions 2 and 2', respectively, overlap, and therefore the tightening of the wing nuts 14 will clamp the two corresponding members together. Since the slots 11 and 11' overlap, there can be some play between the two members to accommodate various sizes of saw teeth.

Attached to the portion 2 of one of the members is a projecting bolt 17 which may be riveted, as indicated at 18, to the member 2. The bolt is provided with screw-threads 19 which engage screw threads 20 formed in the end of one of the crosscut saw handles 21, which may be of metal such as aluminum.

In operation, the crosscut saw handle is removed and screwed onto the bolt 17, as indicated in Figure 3. The frames are adjusted to take care of the proper setting, taking into consideration the length of the teeth and other factors. The wing bolts are all tightened up to bind the two frames tightly together to brace the teeth so that they can be worked upon, and the device is then set in the position shown in Figure 6, where the saw handle 21, in combination with the construction just described, provides a good bracing member for the saw teeth so that they can be held rigid while being filed or straightened, and also raises the saw teeth well above the ground to facilitate the operation. The saw handle 21, in combination with the depending portions 3 and 3', gives a very sturdy braced construction, which may be accurately adjusted to facilitate accurate work in repair or sharpening of the saw in the field.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a crosscut saw supporting means, and in combination, an adjustable member comprising elements adapted to be positioned on opposite sides of the saw blade and having markings thereon to facilitate adjustment of the device on the saw, said adjustable member adapted to be detachably mounted on the blade of the saw to engage a supporting surface, and a saw handle attachable thereto making an angle with the adjustable member and forming with said member a supporting base to maintain the cutting edge of the blade in the raised position, and means to vary the length of saw blade contacted by the adjustable member.

2. In a cross cut saw supporting means, two angular frames, one leg or arm of each frame extending lengthwise of the saw, the other leg or arm of each frame depending from the first, thereby providing supporting legs, the frames being placed on opposite sides of the saw and so arranged that the supporting legs are spaced from each other to give stability, means to clamp the frames together, and means to adjust the frames along the direction of length of the teeth of the blade, whereby the portion of the teeth exposed for repair can be regulated, said frames being adjustable relatively to each other.

3. In a cross cut saw supporting means, two angular frames, one leg or arm of each frame extending lengthwise of the saw, the other leg or arm of each frame depending from the first, thereby providing supporting legs, the frames being placed on opposite sides of the saw and so arranged that the supporting legs are spaced from each other to give stability, said depending leg portions having slots therein, and detachable clamping means adapted to pass through the slots and along and into the slots between the teeth, whereby the portion of the teeth exposed for repair can be regulated.

4. In a cross cut saw supporting means, two angular frames, one leg or arm of each frame extending lengthwise of the saw, the other leg or arm of each frame depending from the first, thereby providing supporting legs, the frames being placed on opposite sides of the saw and so arranged that the supporting legs are spaced from each other to give stability, means to clamp the frames together, means to adjust the frames along the direction of length of the teeth of the blade whereby the portion of the teeth exposed for repair can be regulated, and means to relatively adjust the frames longitudinally of the saw.

5. In a cross cut saw supporting means, two angular frames, one leg or arm of each frame extending lengthwise of the saw, the other leg or arm of each frame depending from the first, thereby providing supporting legs, the frames being placed on opposite sides of the saw and so arranged that the supporting legs are spaced from each other to give stability, said depending leg portions being formed with slots therein, and adjustable clamps passing through the slots and adapted to pass between the teeth of the saw blade, whereby the portion of the teeth exposed for repair can be regulated.

6. In a cross cut saw supporting means, two angular frames, one leg or arm of each frame extending lengthwise of the saw, the other leg or arm of each frame depending from the first, thereby providing supporting legs, the frames being placed on opposite sides of the saw and so arranged that the supporting legs are spaced from each other to give stability, said portion of the frames which extends lengthwise of the saw having slots therein, and clamping means movable in the slots and between the saw teeth whereby the two frames can be clamped together and adjustments made for saws of varying sizes.

7. In a cross cut saw supporting means, two angular frames, one leg or arm of each frame extending lengthwise of the saw, the other leg or arm of each frame depending from the first, thereby providing supporting legs, the frames being placed on opposite sides of the saw and so arranged that the supporting legs are spaced from each other to give stability, means to clamp the frames together, the depending leg portions of the frames being sharpened to hold firmly against the supporting surface, and means to attach the handle of the cross cut saw to one of the angular frames.

8. In a cross cut saw supporting means, two angular frames, one arm or leg of each frame extending lengthwise of the saw, and the other arm or leg of each frame depending from the first, thereby providing supporting legs, means to clamp the frames together, the frames being placed on opposite sides of a saw and so arranged that the supporting legs are spaced from each other to give stability.

9. In a crosscut saw supporting means, and in combination, an adjustable member comprising elements adapted to be positioned on opposite sides of the saw blade and each element having a portion at substantially right angles thereto adjustable as to length of the blade covered and adapted to be detachably mounted on the blade to engage a supporting surface, attaching means adapted to pass between the teeth of the blade and clamped against adjacent teeth to attach the adjustable member, said right angled portions being adjustable toward and away from each other, and a saw handle attachable to the adjustable member, making an angle with the adjustable member and forming with said member a supporting base to maintain the cutting edge of the blade in a raised position.

JAMES N. ALEXANDER.